US008292439B2

(12) United States Patent
Pan

(10) Patent No.: US 8,292,439 B2
(45) Date of Patent: Oct. 23, 2012

(54) IMAGE PROJECTION SYSTEM WITH ADJUSTABLE CURSOR BRIGHTNESS

(76) Inventor: Yang Pan, Shanghai (CN)

( * ) Notice: Subject to any disclaimer, the term of this patent is extended or adjusted under 35 U.S.C. 154(b) by 637 days.

(21) Appl. No.: 12/554,915

(22) Filed: Sep. 6, 2009

(65) Prior Publication Data

US 2011/0057879 A1 Mar. 10, 2011

(51) Int. Cl.
*G03B 21/28* (2006.01)

(52) U.S. Cl. ................ 353/99; 353/31; 353/38; 353/42; 353/46; 353/98; 348/744

(58) Field of Classification Search .................... 353/30, 353/31, 38, 42, 46, 69, 70, 98, 99, 122; 348/468, 348/744, 760, E09.025; 359/726, 872, 385, 359/237, 223.1, 225.1, 224.1; 345/39, 46, 345/82, 83, 152; 700/259
See application file for complete search history.

(56) References Cited

U.S. PATENT DOCUMENTS 4,662,746 A 5/1987 Hornbeck
5,450,148 A 9/1995 Shu et al.
5,633,755 A * 5/1997 Manabe et al. ............... 359/443
5,803,582 A 9/1998 Huang
6,275,214 B1 8/2001 Hansen
6,281,861 B1 8/2001 Harrold
6,417,840 B1 7/2002 Daniels
6,733,135 B2 * 5/2004 Dho ................................ 353/31
6,775,049 B1 * 8/2004 So ................................ 359/291
7,027,041 B2 4/2006 Nishimura et al.
7,061,468 B2 6/2006 Tiphane et al.
7,091,949 B2 8/2006 Hansen
7,101,051 B2 * 9/2006 Shih et al. ...................... 353/99
7,118,225 B2 * 10/2006 Penn .............................. 353/84
7,134,078 B2 11/2006 Vaarala
7,787,992 B2 * 8/2010 Pretlove et al. ............... 700/259
2006/0290809 A1 * 12/2006 Karasawa et al. ............. 348/468
2007/0058142 A1 * 3/2007 Radominski et al. ........... 353/99
2007/0206024 A1 9/2007 Rao
2008/0018591 A1 * 1/2008 Pittel et al. .................... 345/156
2008/0036923 A1 * 2/2008 Urakawa ....................... 348/789
2009/0141195 A1 * 6/2009 Shirai et al. ................... 348/760
2010/0149622 A1 * 6/2010 McAvoy et al. .............. 359/291
* cited by examiner

*Primary Examiner* — Georgia Y Epps
*Assistant Examiner* — Sultan Chowdhury

(57) ABSTRACT

An image projection system is disclosed. The system comprises a projector, a user input device and a computing device. The micro-mirror based projector projects an image including a cursor on a display plane. The present invention discloses various embodiments for the system and method of adjusting the brightness of the cursor to improve effects of a presentation. According to one embodiment, the brightness of the cursor is adjusted by modifying the on/off time ratio of the mirrors by which the cursor is formed. According to another embodiment, the projector comprises a first and a second micro-mirror array. The second array is dedicated for projecting the cursor image. The brightness of the cursor may be adjusted by changing the number of micro-mirrors by which the cursor is formed from the second array.

20 Claims, 9 Drawing Sheets

IMAGE PROJECTION SYSTEM WITH ADJUSTABLE CURSOR BRIGHTNESS

CROSS-REFERENCE TO RELATED APPLICATIONS

Not applicable.

BACKGROUND

1. Field of Invention

This invention relates to an image projection system, specifically to an image projection system with adjustable cursor brightness.

2. Description of Prior Art

When making a presentation for a lecture or the like using a micro-mirror based projector, a laser pointer, which indicates a point on a screen by projecting a laser beam is often used. A laser pointer of this type has, however, the following disadvantages. Shake greatly and adversely influences the pointing operation, thereby making the point unstable. A laser beam may be erroneously projected to be hazardously incident on eyes of audience. In addition, the shape of point is limited to simple shapes such as a circle and a line, which can not satisfy the demand for changing the shape of the point according to the user's preference. Furthermore, the brightness of the point cannot be adjusted.

Conventional computer pointing devices such as a mouse, a trackball, or a touchpad are also known in the prior art. The pointing devices allow a user to control the operation of a cursor on a computer screen and therefore a cursor on a large display plane in a synchronized manner for a presentation system comprising a projector and a computer. Most pointing devices are connected to a computer through a wire. This limits the use of such devices as a control and presentation tool because the wire limits their range of movement and flexibility of connections.

Wireless pointing devices have become available in recent years. The devices allow for greater range of movement and connection flexibility. The wireless pointing devices are preferred for the projector because the lack of a wire or a cord allows a user to freely move about while continuing to maintain control of a cursor on the display plane.

However, a problem with the computer based presentation system with a cursor as the point is that the cursor has the same brightness as the projected image. Audiences may encounter difficulties in capturing the cursor's position on the display plane.

It is therefore desirable to have a computer based presentation system with adjustable cursor brightness, in particularly, with brighter cursor to enable the audiences to capture the movement and position of the cursor easily.

SUMMARY OF THE INVENTION

It is therefore an object of the present invention to provide an image projection system with adjustable cursor characteristics, in particularly the cursor brightness to improve experience of the presenter and the audience.

In one embodiment of the present invention, the brightness of the cursor is adjusted by modifying the on/off time ratio of selected micro-mirrors by which the light beams reflected form pixels of the cursor image.

In another embodiment of the present invention, the image projector comprises a first micro-mirror array for projecting an image such as a slide for a presentation and a second micro-mirror array for projecting an image of a cursor. The projected image of the cursor is formed by a plurality of pixels. The brightness of the cursor may be adjusted by selecting an appropriate number of micro-mirrors from the second array. More mirrors are selected, brighter the cursor. The second array should have a sufficiently large number of mirrors to allow the user to adjust the brightness in a desired range. The micro-mirror arrays are controlled by a controller. The controller translates the user's instructions from the input device into a series of controlling signals for the controller to control the operation of the arrays. The first and the second micro-mirror arrays may be integrated into a single chip.

In yet another embodiment, the methods of modifying the on/off time ratio of the mirrors and the one of using the second micro-mirror array may be combined to deliver a cursor with adjustable brightness.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

Figure 1A:
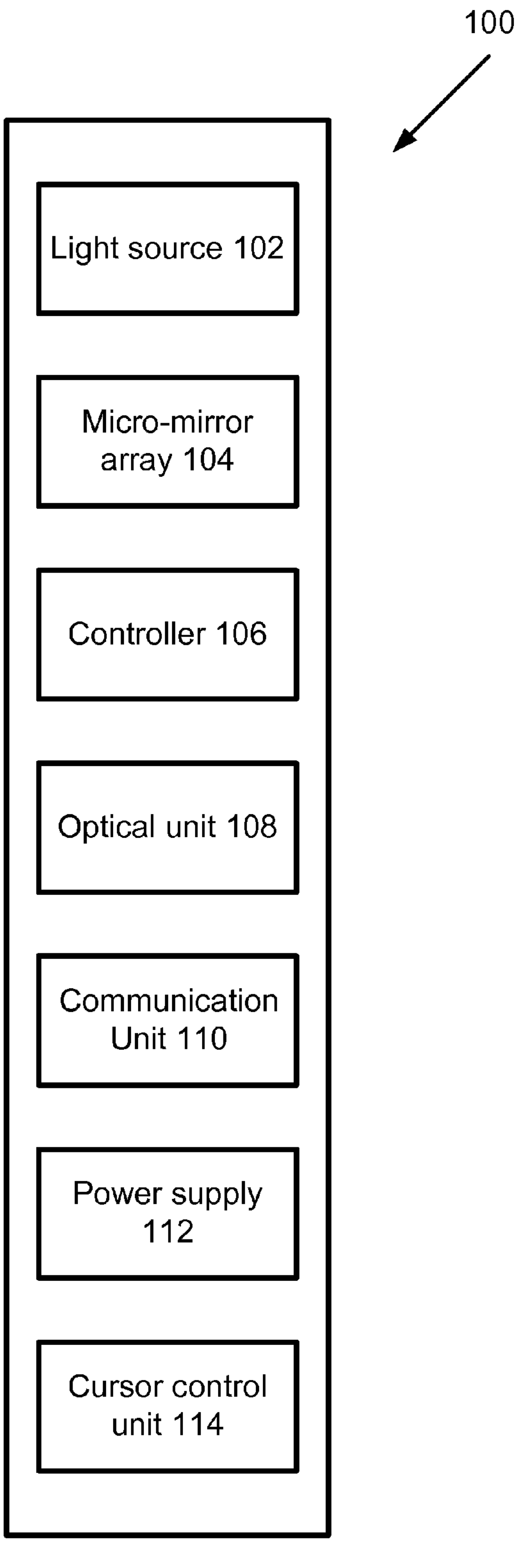
FIG. 1A is a schematic diagram of an exemplary projector according to one embodiment of the present invention. The brightness of the cursor is adjusted by modifying the on/off time ratio of the micro-mirrors by which the reflected light beams form the image of the cursor.

The present invention will now be described in detail with references to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention is based upon a micro-mirror array device or Digital Light Processing (DLP). DLP is a trademark owned by Texas Instruments, Dallas, Tex., representing a technology used in projectors and video projectors. It was originally developed by Larry Hornbeck of Texas Instruments. In DLP projectors, the image is created by microscopically small mirrors laid out in a matrix on a semiconductor chip, known as a Digital Micro-mirror Device (DMD). Each mirror represents one or more pixels in the projected image. 800×600, 1024×768, 1280×720, and 1920×1090 (HDTV) matrices are common DMD sizes. These mirrors can be repositioned rapidly to reflect light either through the lens or on to a heat-sink.

Rapidly toggling the mirror between these two orientations (essentially on and off) produces grayscales, controlled by the on/off time ratio.

One of the methods by which DLP projection systems create a color image is by a single DLP chip approach. Colors are either produced by placing a color wheel between the lamp and the DLP chip or by using individual light sources to produce primary colors, LED's for example. The color wheel is divided into multiple sectors: the primary colors: red, green and blue, and in many cases secondary colors.

The DLP chip is synchronized with the rotating motion of the color wheel so that the red component is displayed on the DMD when the red section of the color wheel is in front of the lamp. The same is true for the green, blue and other sections. The colors are thus displayed sequentially at a sufficient high rate that the observer sees a composite "full color" image.

The main light source used on micro-mirror or DLP-based projector is based on a replaceable high-pressure mercury-vapor metal halide arc lamp unit (containing a quartz arc tube, reflector, electrical connections, and sometimes a quartz/glass shield), while in some newer DLP projectors high power LED's are used as a source of illumination.

The brightness of a projected image can be adjusted by modifying the on/off time ratio of the mirrors. According to one embodiment of the present invention, the brightness of a cursor image may be adjusted by modifying the on/off time ratio of the micro-mirrors by which the cursor image is formed through the reflection of the light beams.

The brightness of a projected image can also be adjusted by directing more or less light beams reflected from the micro-mirrors to form the image of the cursor. A second micro-mirror array may be utilized in a dedicated manner to project the image of the cursor. The number of mirrors in the second array needs to be sufficiently high to allow the brightness of the cursor be adjusted in a desired range.

The brightness of a projected image can further be adjusted by combining the modification of the on/off time and the selection of an appropriate number of mirrors from a dedicated array.

FIG. 1A is a schematic diagram of an exemplary projector 100 according to one embodiment of the present invention. The projector 100 comprises a light source 102, a micro-mirror array 104, and a controller 106. The light source 102 may be a replaceable high-pressure mercury-vapor metal halide arc lamp unit with a color wheel. The light source 102 may also be a plurality of high power LED's. The micro-mirror array 104 may be a DMD or DLP. The controller 106 may be a data processor pertaining to control the operations of the micro-mirror array and the projector. The projector 100 further comprises an optical unit such as lens for directing light beams reflected by the micro-mirror array 104 from the light source 102 to a display plane. The communication unit 110 is for connecting the projector 100 with a computing device and/or a user input device. The communication unit 110 may be a wired connection such as for example an IEEE 1394 type of connection (FIREWIRE) or a Universal Serial Bus type of connection (USB). The communication unit 110 may also be a wireless communication transceiver such as a Bluetooth, WiFi, and ZigBee type of transceiver. A power supply 112 supplies power for the operations of the projector. The projector 100 further comprises a cursor control unit 114. 114 may be implemented as a piece of software. 114 may also be implemented as a piece of hardware or a combination of software and hardware. 114 may be a part of the controller 106.

After receiving the user's selections of the characteristics (e.g. shape, size, color, and brightness) of the cursor from a user interface at a setup phase of the projector, the cursor control unit 114 translates the selections into a set of parameters for controlling the operations of the micro-mirrors by which the cursor is formed. When a user operates a user input device to move the cursor to a desired position on the display plane, a coordinate of the cursor is determined by the controller 106. Micro-mirrors forming the cursor image corresponding to the coordinate are determined. The predetermined control parameters such as the on/off time ratio are applied to each mirror forming the cursor to project a desired image. When the cursor is moving on the display plane, the above mentioned operation is repeated in a rapid manner. The user and the audiences will only observe a moving cursor with desired characteristics.

Figure 1B:
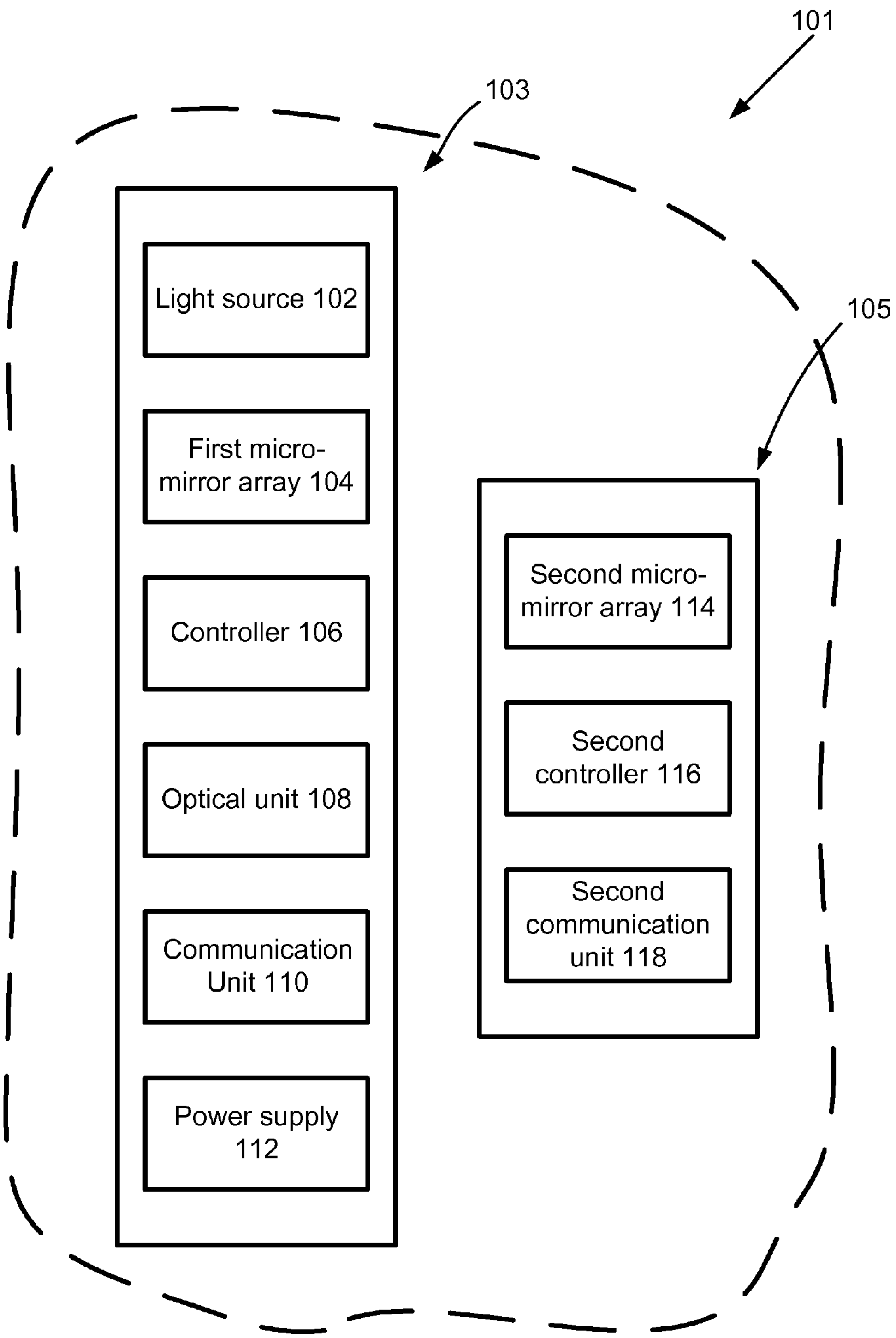
FIG. 1B is a schematic diagram of an exemplary projector according to another embodiment of the present invention. The brightness of the cursor is adjusted by selecting an appropriated number of micro-mirrors from the second micro-mirror array to form the image of the cursor.

FIG. 1B is a schematic diagram of an exemplary projector 101 according to another embodiment of the present invention. The projector 101 comprises a conventional DLP based projector 103 and various units as illustrated in an add-on module 105. The embodiment is characterized by that the projector 101 includes a first micro-mirror array 104 and a second micro-mirror array 114. The second micro-mirror array 114 is dedicated to generate the cursor image. The brightness of the cursor image can be increased significantly by directing more light beams reflected by more micro-mirrors than normally required to form the cursor image. The operation of 114 is controlled by the second controller 116. The first and the second micro-mirror array 104/114 may be integrated in a single chip. The cost by adding a fraction of more micro-mirrors in the same chip is low based upon the integrated circuits based micro-machining process. The first and second controllers 106/116 may be in an integrated form. They may also be separate units.

The second communication unit 118 is used to connect the projector with a user input device. 118 may be a part of wired connection such as the FIREWIRE or the USB type of connection. A wired connection, however, limits the movement of the user (presenter) within a range defined by the length of the connecting cable. A wireless connection by, for example, the Bluetooth transceiver may provide more flexibility for the user.

Figure 2:
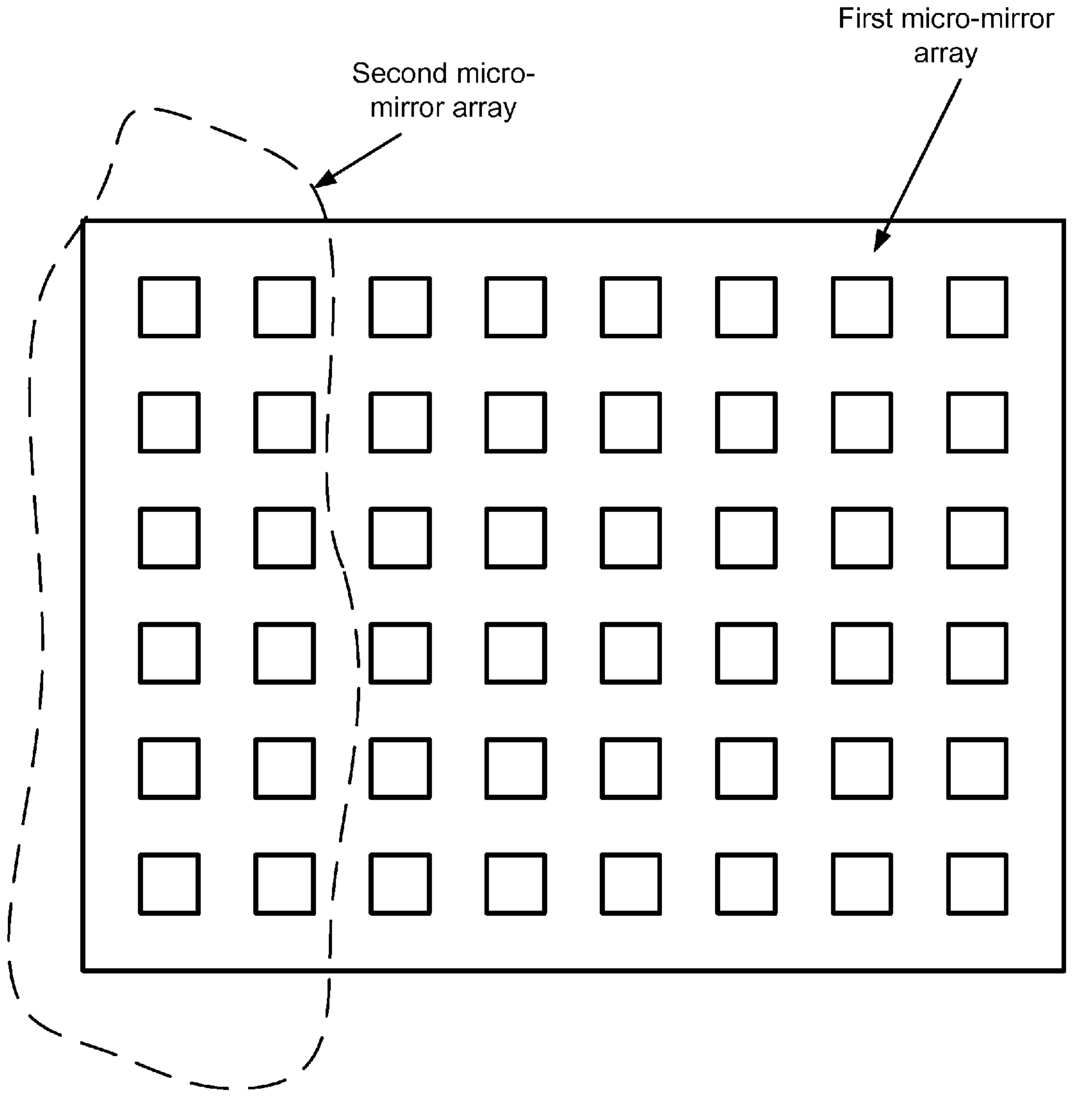
FIG. 2 is a schematic illustration that the first and the second micro-mirror arrays are integrated in a single chip in an exemplary case.

FIG. 2 is a schematic diagram that the first and the second micro-mirror arrays are integrated in a single chip in an exemplary case. The micro-mirrors from the second array may be grouped together as illustrated in the figure. It is, however, not necessary to arrange the mirrors in such a manner. The mirrors from the second array may be arranged in other manners as appropriated. For example, the mirrors from the second array may be divided into four subgroups and be placed at four different corners of the first array.

Figure 3A:
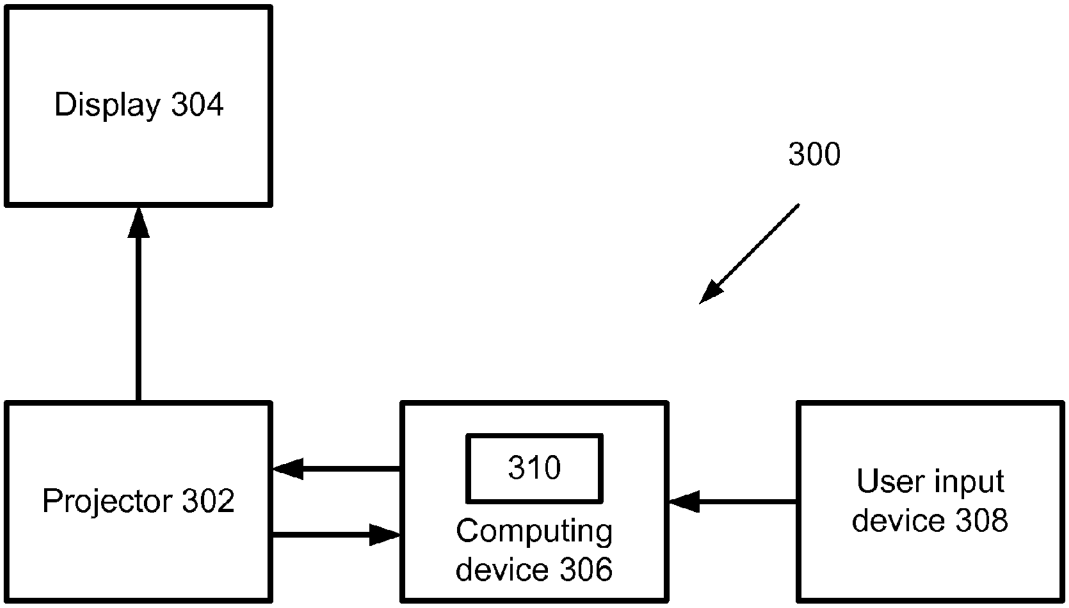
FIG. 3A is a schematic functional block diagram of an image projection system in one embodiment that the user input device is connected to the computing device.

FIG. 3A is a schematic functional block diagram of an image projection system according to one embodiment. The projection system 300 comprises a projector 302, a display 304, a computing device 306 and a user input device 308. The computing device 306 may be a general purpose computer. The computing device 306 comprises a display screen 310. The user input device 308 may be a mouse of the computer. The mouse may be connected to the computer in a wired manner or in a wireless manner as known in the art. After the computing device 306 is connected to the projector 302, the movement of the cursor on the display 304 and the movement of the cursor on the display screen 310 of the computing device 306 are synchronized. The user can control the movement of the cursor on the display 304 by the use of the input device 308.

Figure 3B:
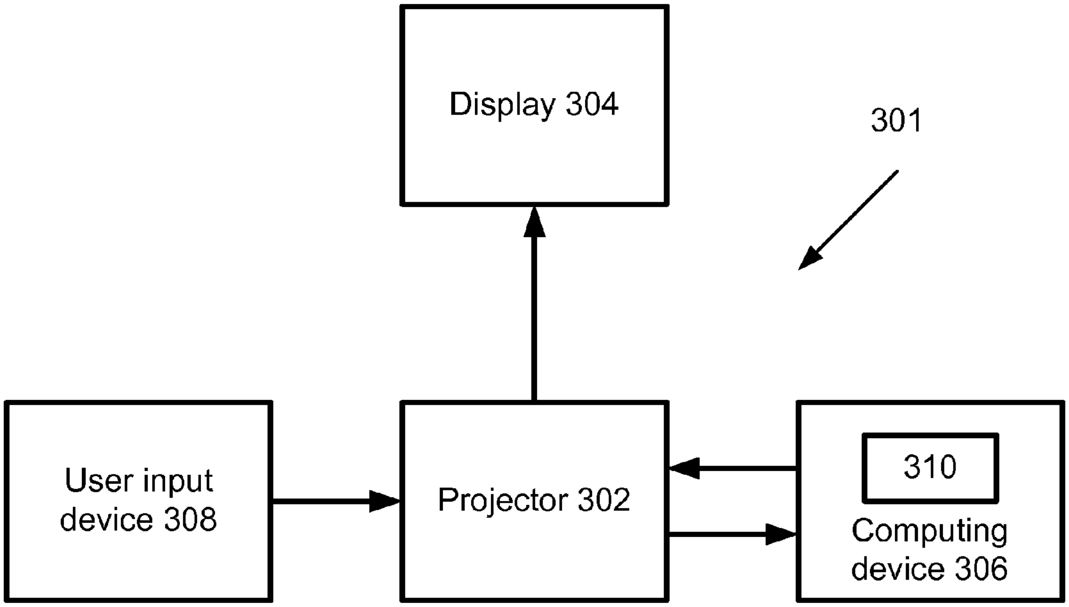
FIG. 3B is a schematic functional block diagram of an image projection system in another embodiment that the user input device is connected to the projector directly.

FIG. 3B is a schematic functional block diagram of an image projection system in another embodiment. The image projection system 301 comprises the projector 302, the display 304, the computing device 306 and the user input device 308. The user input device 308 is connected to the projector 302 directly according to the embodiment. The projector 302 may include a wireless communication unit. 308 may be a wireless mouse in an exemplary embodiment. The advantage of the present embodiment is that the user input device 308 is always connected to the projector even when the computing device 306 is replaced by a different one owned by a different presenter. When the computing device 306 is connected to the projector 302, the movement of the cursor on the display screen 310 of the computing device 306 and the movement of the cursor on the display 304 are synchronized.

Figure 4:
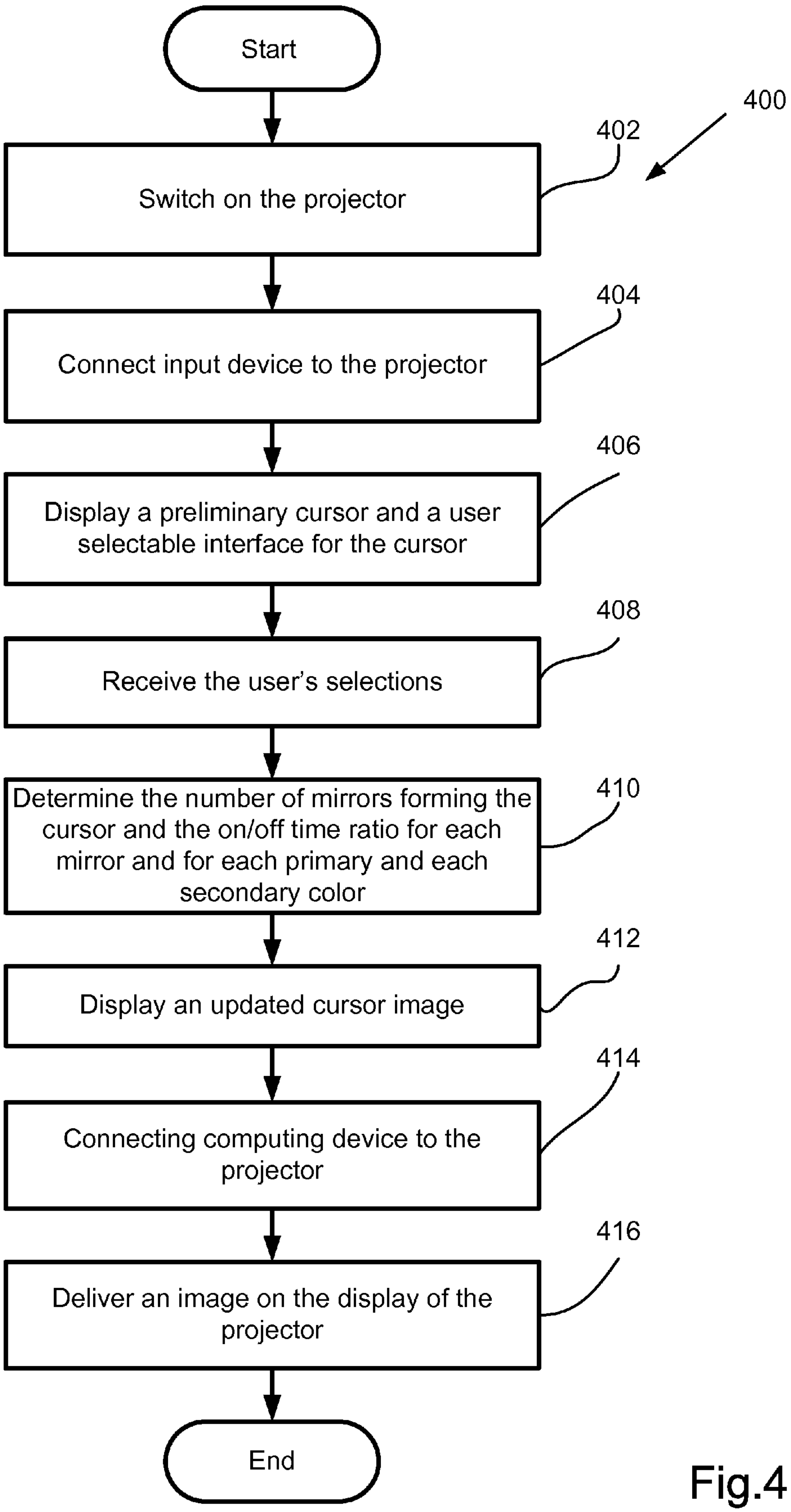
FIG. 4 is a flow diagram depicting steps of operations of the image projection system in accordance with one embodiment of the present invention that the brightness of the cursor is adjusted by modifying the on/off time ratio of the micro-mirrors by which the reflected light beams form the cursor.
Figure 5:
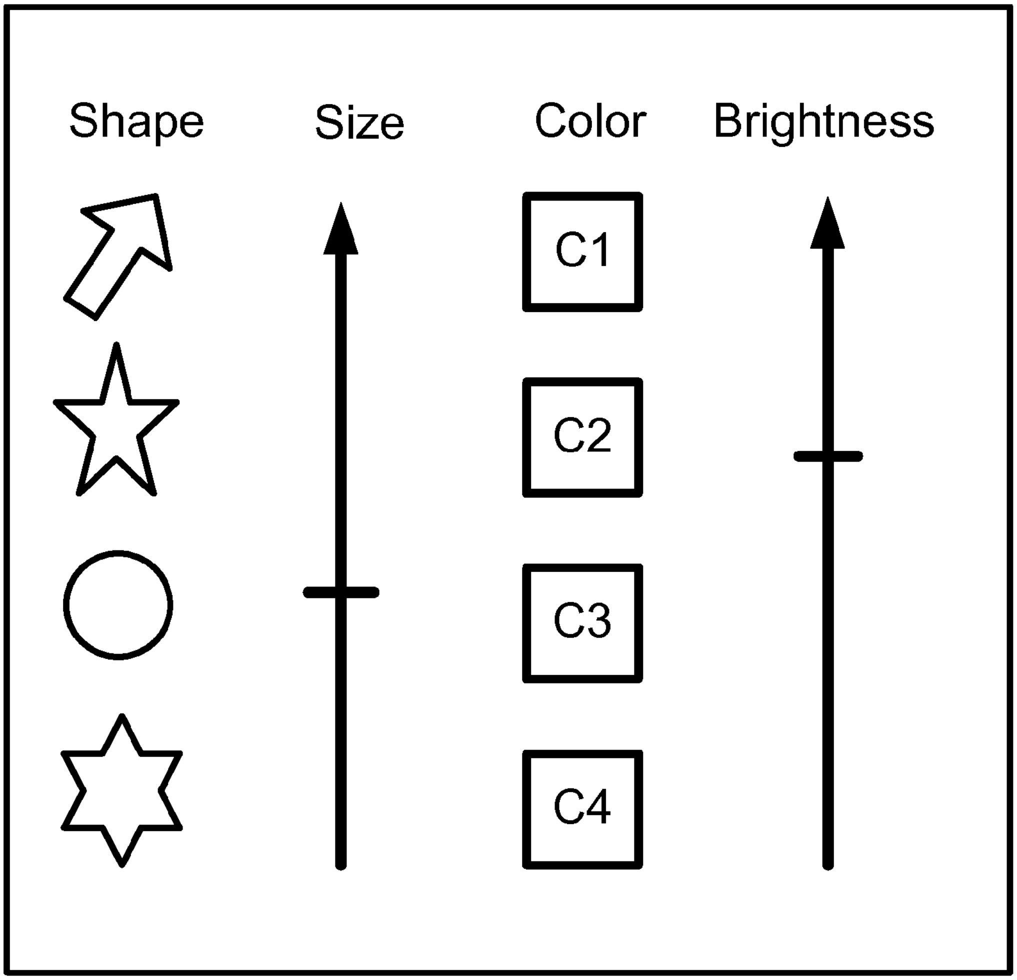
FIG. 5 is a schematic diagram of the user selectable interface for the characteristics of the cursor.

FIG. 4 is a flow diagram depicting steps of operations of the image projection system 301. Process 400 starts with step 402 that the projector 302 is switched on by the user. The user input device 308 is connected to the projector 302 in step 404. A preliminary (or default) cursor image accompanying with a user selectable interface is then displayed on the display 304 in step 406. An exemplary user interface is illustrated in FIG. 5. The characteristics of the cursor include its shape, size, color and brightness. C1 to C4 in the figure stands for different colors. The user can select the desired characteristics by moving the cursor to the right position and actuating the input device 308 to make the selection. The user's selections are received by the projector 302 in step 408. The micro-mirrors by which the cursor is formed is determined in step 410 based upon the shape and size of the cursor selected by the user. The color and the brightness of the cursor is determined by the on/off time ratio for each micro-mirror and for each primary and each secondary color if it is used. An updated cursor is displayed in step 412. It should be noted that steps from 408 to 412 may be repeated until a desired cursor image is established. After the computing device 306 is connected to the projector 302 in step 414, an image such as a slide is delivered by the computing device 306 to the projector 302 and, consequently on the display 304 in step 416. The user can then move the cursor with desired characteristics on the display as a point.

Figure 6:
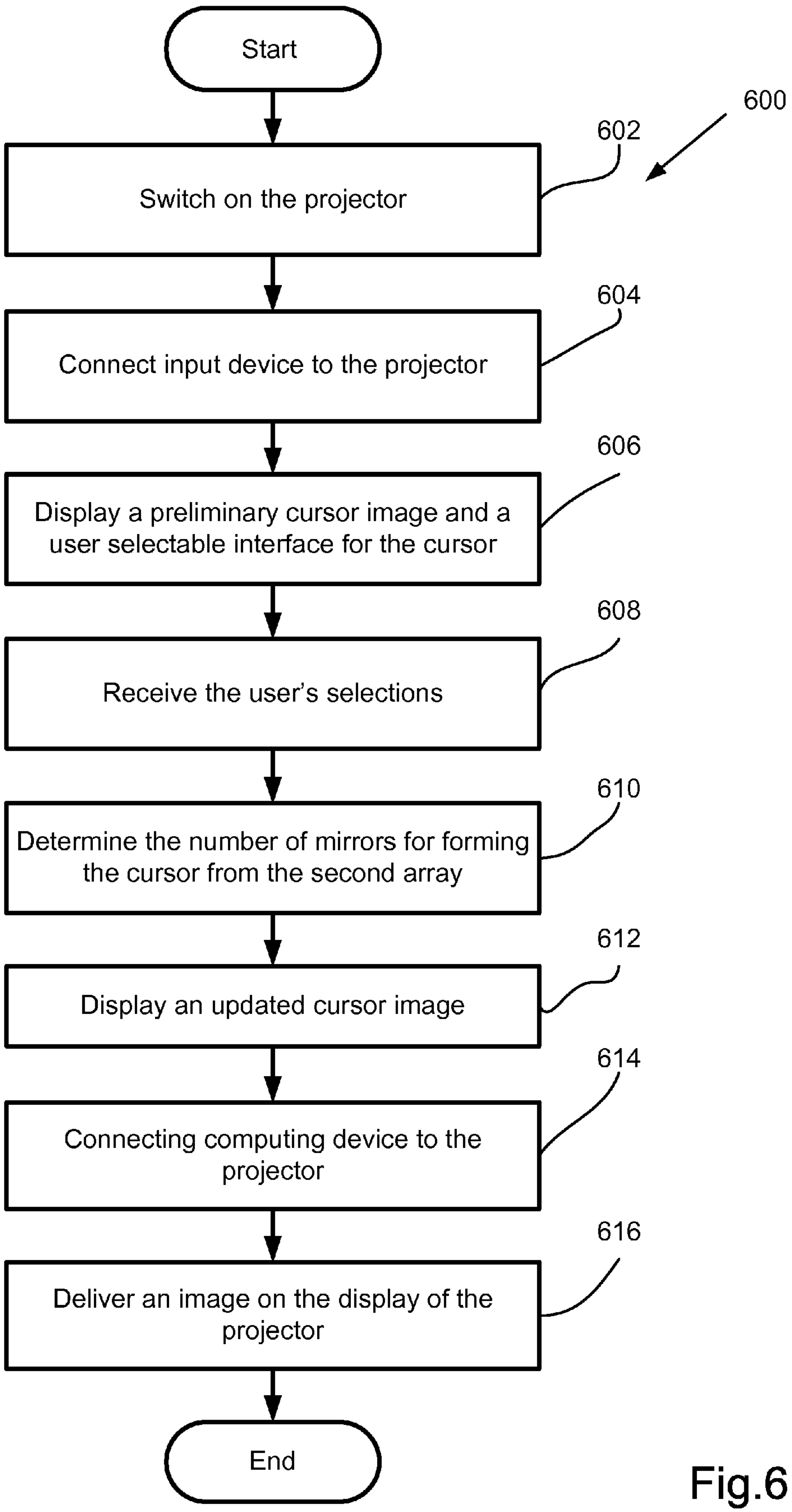
FIG. 6 is a flow diagram depicting steps of operations of the image projection system in accordance with another embodiment of the present invention that the brightness of the cursor is adjusted by selecting an appropriate number of micro-mirrors from the second array.

FIG. 6 is a flow diagram depicting steps of operations of the image projection system 301 according to the embodiment that the projector 302 comprising the first and the second micro-mirror arrays 104/114. The second micro-array 114 is dedicated to project the cursor image. Process 600 starts with step 602 that the projector 302 is switched on by the user. The user input device 308 is connected to the projector 302 in step 604. A preliminary (or default) cursor image accompanying with a user selectable interface is then displayed on the display 304 in step 606. The user's selections are received by the projector 302 in step 608. The number of micro-mirrors by which the cursor is formed is determined in step 610 based upon shape, size and brightness of the cursor selected by the user. The color of the cursor is determined by controlling the on/off time ratio for each primary and each secondary color if it is used. The brightness of the cursor is changeable depending on the number of micro-mirror selected from the second array 114. More micro-mirrors from the second array are selected, brighter the cursor. An updated cursor is displayed in step 612. Steps from 608 to 612 may be repeated by the user until a satisfactory cursor image is displayed. After the computing device 306 is connected to the projector 302 in step 614, an image such as a slide is delivered by the computing device 306 to the projector 302 and, consequently on the display 304 in step 616.

Figure 7:
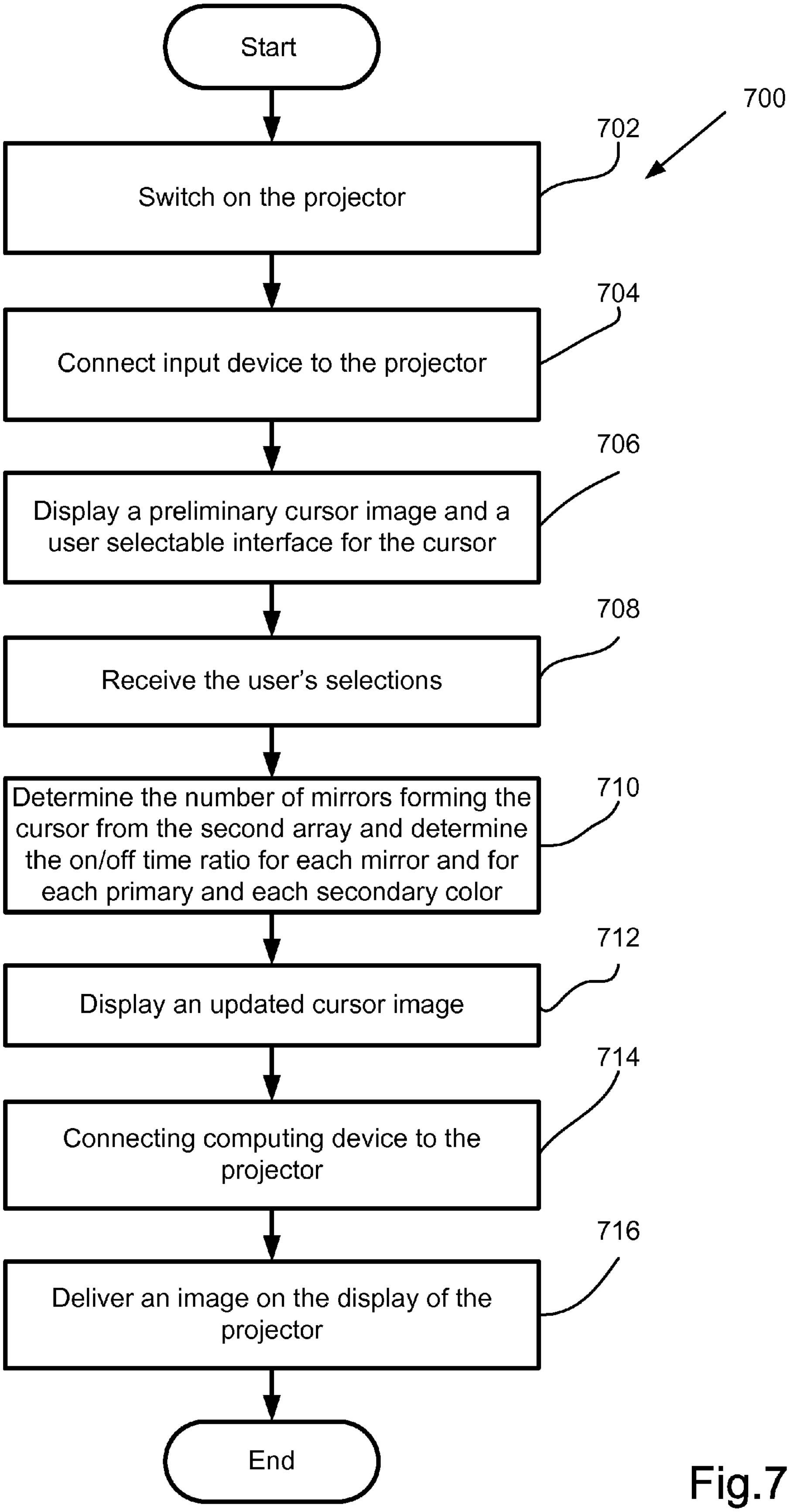
FIG. 7 is a flow diagram depicting steps of operations of the image projection system in accordance with yet another embodiment of the present invention that the brightness of the cursor is adjusted by modifying on/off time ratio of the selected number of micro-mirrors from the second array.

FIG. 7 is a flow diagram depicting steps of operations of the image projection system 301 according to the embodiment that the projector 302 comprising the first and the second micro-mirror arrays 104/114. Further, the brightness of the cursor image may be adjusted by selecting the number of micro-mirror by which the cursor is formed and also by modifying the on/off time ratio for each selected mirror. The second micro-mirror array 114 is dedicated to project the cursor image. Process 700 starts with step 702 that the projector 302 is switched on by the user. The user input device 308 is connected to the projector 302 in step 704. A preliminary (or default) cursor accompanying with a user selectable interface is then displayed on the display 304 in step 706. The user's selections are received by the projector 302 in step 708. The number of micro-mirrors from the second array 114 is determined in step 710 based upon the user selected shape, size and brightness of the cursor. The color of the cursor is determined by controlling the on/off time ratio for each primary and each secondary color if it is used. The brightness of the cursor is changeable depending on the number of micro-mirror selected from the second array 114. The brightness of the cursor can be further modified by controlling the on/off time ratio of each selected micro-mirror from the second array. An updated cursor is displayed in step 712. Steps from 708 to 712 may be repeated until a satisfactory cursor image is displayed. After the computing device 306 is connected to the projector 302 in step 714, an image such as a slide is delivered by the computing device 306 to the projector 302 and, consequently on the display 304 in step 716.

Figure 8:
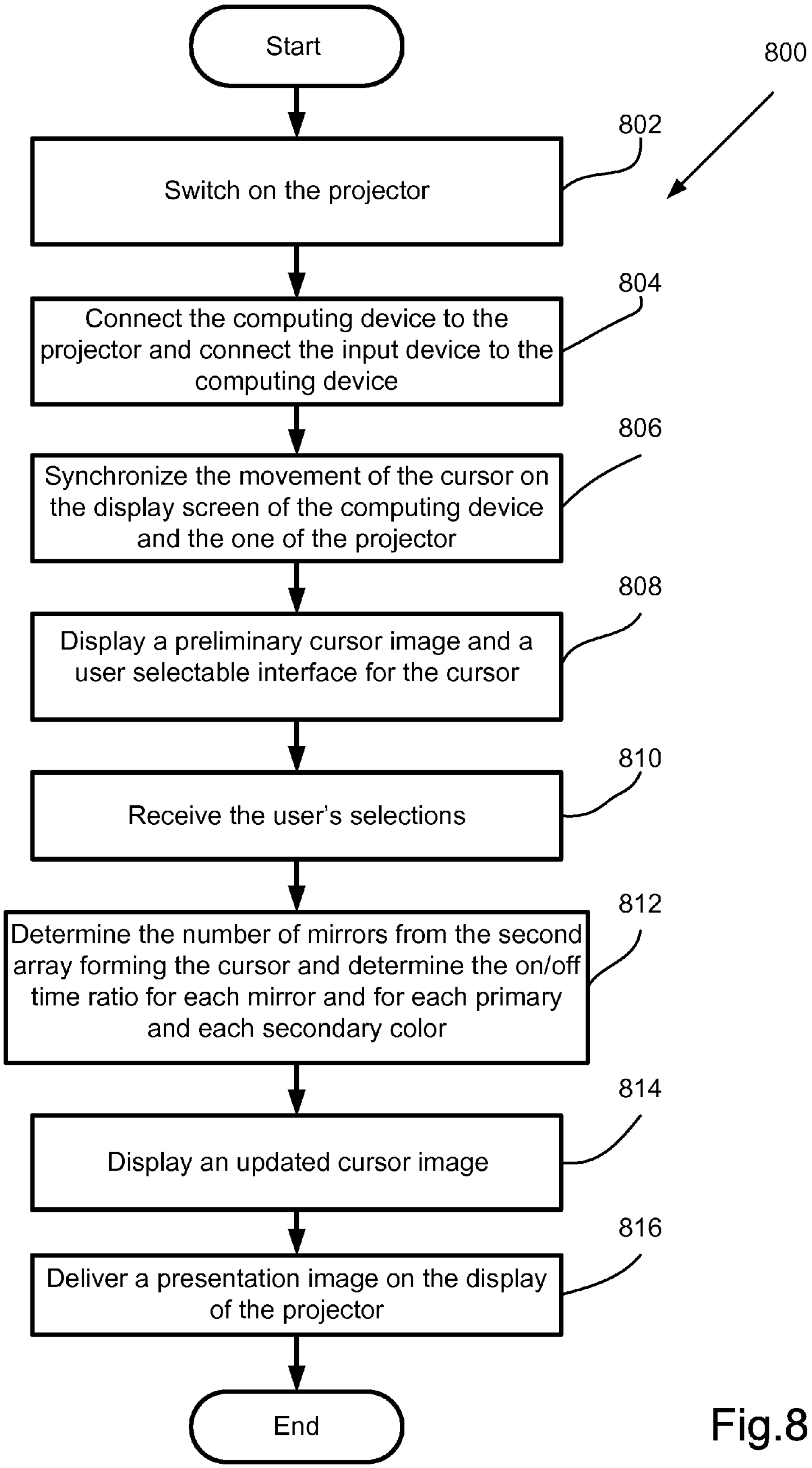
FIG. 8 is a flow diagram depicting steps of operations of the image projection system in accordance with yet another embodiment of the present invention that the user input device is connected through the computing device.

FIG. 8 is a flow diagram depicting steps of operations of the image projection system 300 (the user input device 308 is connected to the computing device 306). Process 800 starts with step 802 that the projector 302 is switched on by the user. The computing device 306 is connected to the projector 302 in step 804. The movement of the cursor on the display screen 310 of the computing device 306 is synchronized in step 806 with the movement of the cursor on the display 304. A preliminary (or default) cursor accompanying with a user selectable interface is then displayed on the display 304 in step 808. The user's selections are received by the projector 302 in step 810. The number of micro-mirrors from the second array 114 by which the cursor is formed is determined in step 812 based upon shape, size and brightness of the cursor selected by the user. The color of the cursor is determined by controlling the on/off time ratio for each primary color and each secondary color if it is used. The brightness of the cursor is changeable depending on the number of micro-mirror selected from the second array 114. The brightness of the cursor can be further modified by controlling the on/off time ratio of each selected micro-mirror. An updated cursor is displayed in step 814.

Steps 810 to 814 may be repeated until a satisfactory cursor image is displayed. An image such as a slide is delivered by the computing device 306 to the projector 302 and, consequently on the display 304 in step 816.

The invention claimed is:

1. An image projection system comprising:

(a) a projector including a first micro-mirror array and a second micro-mirror array on a single micro-chip; and (b) an input device wherein said first micro-mirror array is used for projecting an image on a display plane and said second micro-mirror array is used exclusively for projecting a cursor image overlapping the image.

2. The system as recited in claim 1, wherein said projector further comprising a light source and a communication unit.

3. The system as recited in claim 2, wherein said communication unit conforms to a standard including an IEEE 1394 type of connector or a Universal Serial Bus type of connector.

4. The system as recited in claim 2, wherein said communication unit conforms to a standard or a combination of standards from the following group:

(a) ZigBee (IEEE 802.15.4 and its amendments);

(b) Bluetooth (IEEE 802.11 b and its amendments); and (c) WiFi (IEEE 802.11 and its amendments).

5. The system as recited in claim 1, wherein the cursor image further comprising a plurality of pixels formed from reflected light beams by a group of micro-mirrors selected from the second micro-mirror array.

6. The system as recited in claim 5, wherein brightness of the cursor image is adjusted by adding or reducing number of selected micro-mirrors from the second micro-mirror array by the projector.

7. The system as recited in claim 1, wherein said system further comprising a computing device.

8. The system as recited in claim 7, wherein said computing device further comprising a user interface for receiving the user's inputs for adjusting the brightness of the cursor image through the user input device.

9. A method of adjusting brightness of a cursor image on a display plane of a projection system comprising a projector including a first micro-mirror array and a second micro-mirror array, a user input device and a computing device, the method comprising:

(a) connecting the user input device to the projector;

(b) displaying a plurality of user selectable items including brightness of the cursor image;

(c) receiving the user's selection through the input device; and (d) adjusting the brightness of the cursor image by changing the number of selected micro-mirrors from the second micro-mirror array by which the reflected light beams form pixels of the cursor image, wherein said first micro-mirror array and said second micro-mirror array are on a single micro-chip, wherein said second micro-mirror array is used for projecting the cursor image exclusively.

10. The method as recited in claim 9, wherein said method further comprising connecting the user input device to the projector through the computing device.

11. The method as recited in claim 9, wherein said first micro-mirror array is used for projecting an image based upon a data file transmitted from the computing device.

12. A method of projecting an image and a cursor image on a display plane comprising:

(a) displaying the image on the display plane by a first micro-mirror array;

(b) displaying the cursor image overlapping the image on the display plane by a second micro-mirror array; and (c) adjusting by a controller brightness of the cursor image by adjusting number of micro-mirrors selected from said second micro-mirror array, wherein said first micro-mirror array and said second micro-mirror array are on a single micro-chip, wherein said second micro-mirror array is used for projecting the cursor image exclusively.

13. The method as recited in claim 12, wherein said method further comprising determining by the controller a on/off time ratio for each of the selected micro mirrors in said second micro-mirror array to meet brightness requirements based on the user's inputs from the input device.

14. The method as recited in claim 12, wherein said method further comprising determining a coordinate of the cursor image on the display plane based upon the user's inputs from the input device.

15. The method as recited in claim 12, wherein said method further comprising receiving the user's inputs by displaying a plurality of user's selectable items for the cursor's characteristics on the display plane at a setup phase of projector operation.

16. The method as recited in claim 15, wherein said cursor's characteristics further including a shape of the cursor image.

17. The method as recited in claim 15, wherein said cursor's characteristics further including a color of the cursor image.

18. The method as recited in claim 15, wherein said cursor's characteristics further including a size of the cursor image.

19. The method as recited in claim 12, wherein said method further comprising connecting the input device to the projector through a wireless communication link.

20. The method as recited in claim 12, wherein said method further comprising connecting the projector to a computing device.

* * * * *